United States Patent Office 2,810,923
Patented Oct. 29, 1957

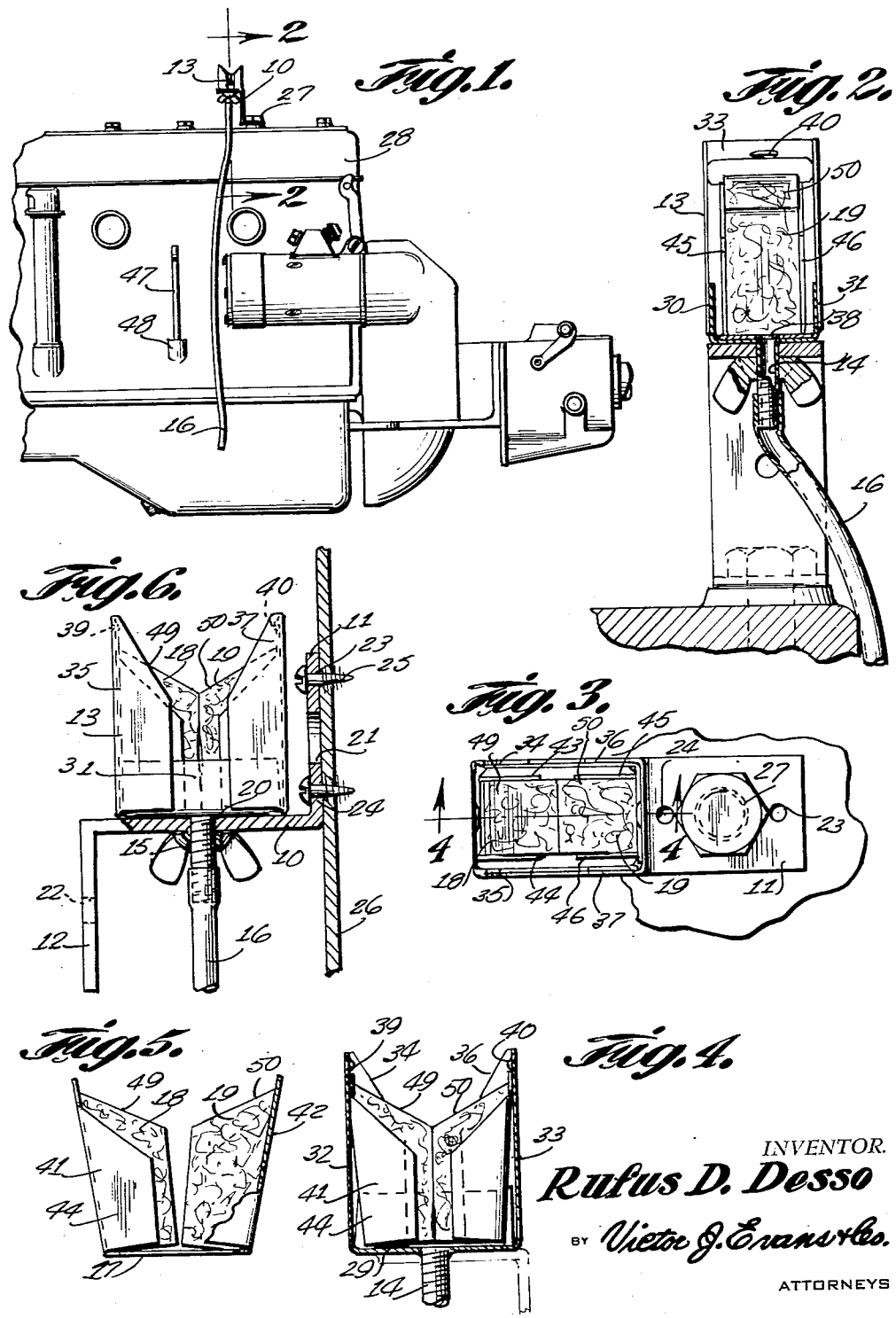

2,810,923

DIP STICK WIPER

Rufus D. Desso, Somers, Conn.

Application December 9, 1954, Serial No. 474,130

3 Claims. (Cl. 15—210)

This invention relates to motor vehicle accessories of the type particularly adapted for use in combination with internal combustion engines, and in particular, pieces of felt positioned in a suitable holder on a bracket adapted to be attached to an engine of a motor vehicle or mounted on the cowl or other part thereof whereby upon removing the conventional dip stick from an opening in the crank case of the engine the stick may be drawn through the pieces of felt to remove oil therefrom.

The purpose of this invention is to provide a wiper for the dip stick of an internal combustion engine in which the wiper is adapted to remain in position continuously whereby the necessity of looking for a cloth or the like for wiping oil from the dip stick is eliminated.

In the conventional method of determining the quantity of oil in the crank case of a motor vehicle engine, a rod is withdrawn from an opening in the engine housing, oil wiped from the rod, the rod reinserted and after being positioned in the oil the rod is again withdrawn and the amount of oil remaining on the rod shows the elevation of the oil in the crank case. In numerous instances, and particularly when the operator of a vehicle stops on a highway to ascertain the amount of oil in the engine, it is difficult to find a piece of cloth or other material that is adapted to be used for wiping oil from the dip stick without the possibility of placing sand, or other foreign matter on the dip stick. With this thought in mind, this invention contemplates a substantially permanent wiper mounted on a bracket and adapted to be installed on the engine of a motor vehicle or at a convenient point below the hood of the vehicle whereby upon withdrawing the rod from the oil opening it may readily be drawn through the wiper to remove oil therefrom.

The object of this invention is, therefore, to provide a wiper for the dip stick of an internal combustion engine in which the wiper is adapted to remain permanently on the engine or in close proximity thereto.

Another object of the invention is to provide a wiper for the oil rod of an internal combustion engine in which oil may be removed from the rod without danger of placing grit or other foreign matter on the rod.

Another important object of the invention is to provide a wiper for removing oil from the dip stick of an internal combustion engine in which means is provided for carrying oil remaining in the wiper to the ground or highway below the engine.

A further object of the invention is to provide a wiper adapted to be permanently attached to a motor vehicle with which oil may be wiped from the dip stick of the engine of the vehicle in which the wiper and mounting means therefor is of a simple and economical construction.

With these and other objects and advantages in view, the invention embodies a substantially Z-shaped bracket and a holder having pieces of felt secured in an insert frictionally held therein, and a drip tube extended from a threaded tube mounted in the lower end of the holder and on which a thumb nut is threaded for securing the holder in a flange of the bracket.

Other features and advantages of the invention will appear from the following description taken in connection with the drawing, wherein:

Figure 1 is a side elevational view showing a portion of an internal combustion engine with the dip stick wiper of this invention secured by one of the bolts of the cylinder head in operative position upon the engine.

Figure 2 is a vertical section taken on line 2—2 of Figure 1 with the parts shown on an enlarged scale illustrating the construction of the felt holder of the wiper and also showing the mounting bracket thereof.

Figure 3 is a plan view of the dip stick wiper with the parts as shown in Figure 2.

Figure 4 is a longitudinal section through the holder of the wiper taken on line 4—4 of Figure 3.

Figure 5 is a side elevational view of the felt retaining insert adapted to be frictionally held in the holder of the wiper with part of one side of the insert broken away and showing the parts spread by resiliency inherent in the material thereof.

Figure 6 is a side elevational view illustrating the felt retaining holder and showing the bracket on which the holder is retained secured to a wall, such as the vertically disposed section of the cowl of the vehicle, parts of the bracket and wall being broken away and shown in section.

Referring now to the drawing, wherein like reference characters denote corresponding parts, the improved dip stick wiper of this invention includes a bracket having an intermediate section 10 with mounting and holding flanges 11 and 12 extended in opposite directions from ends thereof, a holder 13 having a threaded tube 14 extended from the lower part, a thumb nut 15 threaded on the tube 14, a drip tube 16 extended from the lower end of the tube 14, an insert 17 adapted to be positioned in the holder 13, and blocks 18 and 19 of felt or other suitable absorbent material, said blocks being adapted to be positioned in the insert 17, as shown in Figure 5.

The intermediate section 10 of the mounting bracket is provided with an opening 20 through which the threaded tube 14 extends, as shown in Figure 6, and similar openings 21 and 22 are provided in the flanges 11 and 12, respectively, whereby the bracket is adapted to be positioned as shown in Figure 6, or as shown in Figure 1, and with the holder 13 vertically positioned in both types of installations.

The flange 11 is also provided with openings 23 and 24 that are positioned to receive screws 25 to facilitate mounting the bracket on a wall, such as a wall 26. The opening 21 is also adapted to receive a bolt, such as a bolt 27, of a cylinder head 28, in which position the holder 13 is mounted on the flange 12 with the threaded tube 14 extended through the opening 22 therein.

In the design shown, the holder 13 is provided with a base 29 having flanges 30 and 31 at the sides and walls 32 and 33 at the ends. The wall 32 is provided with side flanges 34 and 35 and the wall 33 with similar flanges 36 and 37. The threaded tube 14 extends from an opening 38 in the base 29 of the holder.

The walls 32 and 33 are provided with projections 39 and 40 on inner surfaces of the upper ends which prevent the insert 17 being accidentally displaced from the holder.

The insert 17 is provided with a base having end walls 41 and 42 extended upwardly from ends thereof, the wall 41 being provided with side flanges 43 and 44 and the end wall 42 with similar flanges, as indicated by the numerals 45 and 46. The blocks 18 and 19, which are formed of felt or other suitable absorbent material, are retained in the insert by the side flanges and with the parts in position the insert is pressed into the holder 13, the insert being retained in position by the projections 39 and 40.

The dip stick wiper of this invention is adapted to be positioned on an engine of a motor vehicle with one of the flanges 11 or 12 clamped below the head of a bolt, such as the bolt 27, and with the holder having the insert and pieces of felt or the like therein mounted on the intermediate web or flange of the bracket with the threaded tube extended through an opening therein and with the holder secured in position by the thumb nut 15.

The wiper is adapted to be used continuously with the dip or oil rod, such as rod 47, adapted to be removed from an oil opening 48 and pressed between the blocks 18 and 19. The upper surfaces of the blocks or pieces of felt are inclined, as indicated by the numerals 49 and 50, to facilitate inserting the oil rod or stick between the blocks. Upon drawing the rod or stick between the blocks, oil is wiped from the stick and upon saturation of the blocks with oil excess oil flows downwardly through the threaded tube 14 and drip tube 16.

It will be understood that the device may be positioned at a suitable point on or around the engine; and it will also be understood that modifications, within the scope of the appended claims, may be made in the design and construction of the device without departing from the spirit of the invention.

What is claimed is:

1. A wiper for an oil gauge rod of an internal combustion engine comprising a substantially Z-shaped bracket having flanges extended from opposite sides of an intermediate web and in which the flanges and web are provided with openings, a holder having an opening in the lower part thereof, a threaded tube communicating with the opening in the holder, extending downwardly from the holder and the holder being positioned in the bracket with the tube in an opening of the bracket, a thumb nut threaded on the tube for clamping the holder to the bracket, a drip tube extended downwardly from the extended end of the threaded tube and in communication therewith, an insert frictionally retained in the holder, and felt blocks positioned in the insert so that oil collected by said felt blocks will drain outwardly of the holder by means of said threaded tube and drip tube.

2. In a wipper for the oil gauge rod of an internal combustion engine, the combination which comprises a bracket having an intermediate web with oppositely disposed flanges extended from ends thereof and with openings through the flanges and web, a holder having a base with side flanges extended upwardly therefrom and with end walls having flanges extended from edges thereof adapted to be positioned on a web or one of the flanges of the bracket, said holder having an opening in the base, a threaded tube communicating with said opening and extended downwardly from the base, the threaded tube being extended through the opening in the web of the bracket, a thumb nut threaded on said threaded tube, and engaging said bracket to clamp the holder in position on said bracket, and wiping material frictionally held in said holder above the opening in said base so that oil collected by said wiping material will drain outwardly of the holder by means of said threaded tube.

3. In a wiper for the oil gauge rod of an internal combustion engine, the combination which comprises a bracket having an intermediate web with oppositely disposed flanges extended from ends thereof and with openings through the flanges and web, a holder having a base with said flanges extended upwardly therefrom and with end walls having flanges extended from edges thereof adapted to be positioned on a web or one of the flanges of the bracket, said holder having an opening in the base, a threaded tube communicating with said opening and extended downwardly from the base, the threaded tube being extended through the opening in the web of the bracket, a thumb nut threaded on said threaded tube and engaging said bracket to clamp the holder in position on said bracket, a drip tube extended from the lower end of the threaded tube and an insert having blocks of felt therein with end walls having flanges at the sides frictionally retained in said holder, said blocks of felt being positioned above the opening in said base so that oil collected by said blocks of felt will drain outwardly of the holder by means of said threaded tube, and said holder having means for retaining the insert therein.

References Cited in the file of this patent
UNITED STATES PATENTS

| | | |
|---|---|---|
| 1,653,315 | Sevigny | Dec. 20, 1927 |
| 1,719,037 | Wolf | July 2, 1929 |
| 1,759,788 | Holveck | May 20, 1930 |
| 1,916,933 | Peck | July 4, 1933 |
| 2,011,635 | Homan | Aug. 20, 1935 |